United States Patent

Ban

[15] 3,693,981

[45] Sept. 26, 1972

[54] TAPE PLAYING APPARATUS FOR USE WITH PLURALITY OF ENDLESS MAGNETIC TAPE CARTRIDGES

[72] Inventor: Itsuki Ban, 829 Higashi-Oizumimachi, Nerima-ku, Tokyo-to, Japan

[22] Filed: Aug. 18, 1970

[21] Appl. No.: 64,743

[30] Foreign Application Priority Data

Aug. 20, 1969 Japan ....................44/78509

[52] U.S. Cl. ..............................274/4 F, 179/100.2 Z

[51] Int. Cl. ..............................................G11b 23/12

[58] Field of Search .................274/4 F; 179/100.2 Z; 242/197–200, 55.19 A, 180, 181

[56] References Cited

UNITED STATES PATENTS

| | | | |
|---|---|---|---|
| 3,127,178 | 3/1964 | Osborne | 274/4 F |
| 3,511,508 | 5/1970 | Ban | 274/4 F |
| 3,578,334 | 5/1971 | Ban | 274/4 F |

*Primary Examiner*—Leonard Forman
*Assistant Examiner*—Dennis A. Dearing
*Attorney*—Jacobs & Jacobs

[57] ABSTRACT

A tape playing apparatus for use with a plurality of endless magnetic tape cartridges which comprises a rotatable carriage provided with a holding device for radially holding two groups of cartridges in a manner such that one group is laid over the other group and offset to one another, a device for rotatably driving said carriage, a driving device for moving up and down the upper cartridges and the lower cartridges by a distance corresponding to the difference in level of the cartridges, first latch device for arresting rotation of the carriage to hold one of the cartridges in a predetermined position, a reciprocally movable deck provided with reproducing members such as a capstan, a magnetic head and the like for reproducing the cartridge in the play position, driving device for moving the deck into and from a reproducing station where the reproducing members play the cartridge in the play position and a non-reproducing station where the reproducing members are away from the cartridge, and a second latch device for holding the deck in the reproducing station.

10 Claims, 4 Drawing Figures

TAPE PLAYING APPARATUS FOR USE WITH PLURALITY OF ENDLESS MAGNETIC TAPE CARTRIDGES

BACKGROUND OF THE INVENTION

This invention relates to a tape playing apparatus for use with a plurality of endless magnetic tape cartridges, and more particularly to a tape player of the type where there is provided a rotatable carriage receiving a plurality of tape cartridges in a manner that one group is laid over the other group horizontally and radially, and that one of the cartridges is brought to a play position by rotation of the carriage.

Various tape playing apparatus for use with a plurality of endless tape cartridges of those classes have been proposed by not only the present inventor but also many others. Those well known tape players have disadvantages that the diameter of the carriage must be increased as the number of cartridges received therein is increased. In order to receive a great number of cartridges in a tape player housing without increasing the diameter of the carriage, there has been proposed a two-stage carriage provided in the housing. This doubles the reproducing members such as capstan, magnetic head and the like for playing the cartridge in the play position. Further, two magnetic heads require a switch for applying selectively two outputs of the magnetic heads to the input side of the amplifier when the output of the magnetic heads are amplified by a common amplifier. Such complicates the structure of the device.

The present inventor for this invention has succeeded in providing a carriage which is capable of storing more cartridges without making it the two-stage type and making the diameter larger.

SUMMARY OF THE INVENTION

It is, therefore, a primary object of the invention to provide a tape playing apparatus for use with a plurality of endless magnetic tape cartridges having an improved rotatable carriage which receives a plurality of the cartridges in a manner such that one group is laid over the other in two stages, and wherein one of the cartridges is held in the play position and played in relation to rotation of the carriage.

Another object of the invention is to provide a tape playing apparatus for use with a plurality of endless magnetic tape cartridges wherein the upper cartridges and lower cartridges on the carriage are moved up and down when the carriage is rotated by distance corresponding to a difference in level of the cartridges while the cartridge brought to the play position is held in a given level.

A further object of the invention is to provide a tape playing apparatus for use with a plurality of endless magnetic tape cartridges wherein members such as capstan, magnetic head and the like for playing one of the cartridges in the play position are provided on a deck which is reciprocally moved from and into a reproducing station where the cartridge is played and a non-reproducing station.

Still further object of the invention is to provide a tape playing apparatus for use with a plurality of endless magnetic tape cartridges wherein one of the cartridges is designated and the designated cartridge is brought to the play position at the same time rotation of the carriage is stopped to automatically hold the designated cartridge in the play position and play the same.

According to the present invention, the apparatus may be compactly constructed to permit of accommodation of a large number of the tape cartridges.

Further objects and features of the invention will be apparent from the detailed description on preferred embodiments with reference to the accompanying drawings:

DESCRIPTION OF THE PREFERRED EMBODIMENTS

Figure 1:
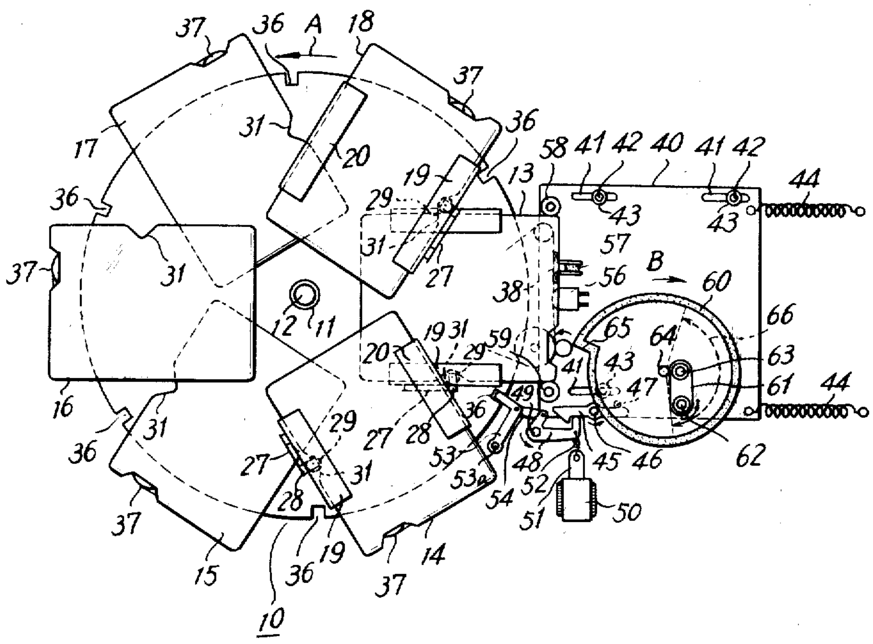
FIG. 1 is a representation of a tape playing apparatus for use with a plurality of endless magnetic tape cartridges according to the present invention, with some parts omitted for simplicity.
Figure 2:
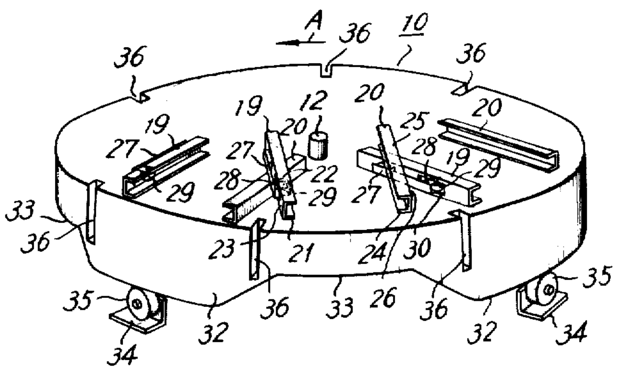
FIG. 2 is a representation of the carriage portion shown in FIG. 1, with some parts omitted.

Referring to the drawings, particularly to FIG. 1, a tape player utilizing a plurality of endless magnetic tape cartridges, according to the present invention, includes a carriage 10 to which a plurality of cartridges are releasably mounted. The carriage 10 is of generally circular shape and is rotatably and slidably supported through a center hole 11 formed thereon by a shaft 12 which is at one end mounted to a base of a player housing (not shown) and upwardly and vertically extended from the base. In this instance, the carriage 10 is designed to receive six cartridges 13 to 18 therein and six associated holding elements (only three of them are shown in FIGS. 1 and 2) are provided for holding the respective cartridges. Each of the holding elements has two guide members 19 and 20 spaced from and parallel to each other. The guide member, best seen from FIG. 2, is of U - shape in section and includes an elongated lower horizontal part 21, upper horizontal part 22 parallel thereto, and a vertical part 23. Similarly, the guide member 20 includes a lower horizontal part 24, upper horizontal part 25, and a vertical part 26. A space between the lower horizontal part and the upper horizontal part with respect to the guide member is somewhat more wider than the thickness of the cartridge. A displaceable member 27 of a leaf spring is fixed at its one end to the outer side of the vertical part 23 of the guide member 19 in a suitable manner. The displaceable member 27 is provided at its free end with a bent portion 28 which passes through a hole 30 bored through the vertical part 23 and extends between the lower horizontal part 21 and the upper horizontal part 22. A retention roller 29 is provided t the bent portion 28. The retention roller 29 is pressed against a notch 31 on the side wall of the cartridge to be inserted between the guide members 19 and 20 under the resilient force of the displaceable member 27. This will hold the cartridge in position between the guide members 19 and 20.

In the embodiment as illustrated, one group of the guide members for holding the cartridges 13, 15 and 17 is attached in a suitable manner to the carriage 10 at its surface, and the other group of the guide members for holding the cartridges 14, 16 and 18 is in turn attached to one group of the guide members at its upper horizontal part. With this arrangement, the three cartridges of one group are positioned in a manner that an angle formed by the longitudinal center axes of the adjacent cartridges is 60° with respect to the center of the circular carriage, and the three cartridges of the other group are also positioned over the one group in the same manner but are offset thereto, as shown in FIG. 1.

The carriage 10 has at its lower edge flanges 32 and reduced portions 33 formed therebetween. The flanges and reduced portions are alternately provided to each other and are circumferentially positioned to form 60° with respect to the center of the circular carriage 10. The flanges 32 are provided to correspond to one holding element for holding the cartridge 13, 15 and 17 and the reduced portions 33 are formed to correspond to the other holding elements for holding the cartridge 14, 16 and 18.

The lower edge of the carriage 10 rides against rollers 35 rotatably supported by brackets 34 fixed to the base of the player housing. For the illustrative purpose, only two rollers are shown, however, there are provided three rollers circumferentially positioned to form 120° with respect to the center of the circular carriage 10. In FIG. 2, the carriage 10 rides against the rollers 35 at its flanges 32 and is adapted to slide downwardly with respect to the shaft 12 to allow the reduced portion to ride against the rollers 35 when the carriage 12 is being rotated through 60° by driving means as will be described later. The difference in level between the flanges 32 and the reduced portions 33 is the difference in level between the lower group of the cartridges 13, 15 and 17 and the upper group of the cartridges 14, 16 and 18. For this reason, if the carriage is rotated, and moved up and down by engagement of the flanges and reduced portions with the rollers 35, it will be understood that the cartridges 13 to 18 are brought to the same level in the play position as will be described later. Six slots 36 are equally spaced to one another at the periphery of the carriage 10 and operation of the slots will be described later. The cartridges 13 to 18 are held by the holding elements in a manner that the forward end of each cartridge is extended from the periphery of the carriage 10.

Numeral 40 is a deck which is slidably supported by guide rods 42 that pass through elongated slots 41 formed in the deck and mounted to a sub-plate (not shown) provided within the player housing. Upward and downward movement of the deck 40 is limited by rings 43 mounted to the rods 42. On the other hand, the deck 40 is intended to be rightwardly moved by a tension springs 44. As shown, the deck 40 is shown as being held in position against the bias of the springs since a hook lever 45 pivoted to an axis 46 fixed to the deck 40 is engaged by a first latch lever 48 pivoted to an axis 49 on the sub-plate (not shown). The latch lever 48 is given a rotational force in the direction of the arrow as shown by a spring (not shown) and movement of the latch lever is limited in a position to have engageable relationship with the hook lever 45 as the latch lever is connected through a connecting spring 52 with a plunger 51 of a solenoid attached to the sub-plate (not shown). A L-shaped second latch lever 53 having one end pivoted to an axis **53*a* mounted to the sub-plate is connected through a link 54 to the first latch lever 48. The second latch lever 53 is adapted to allow its end to enter into one of the slots 36 of the carriage 10 to arrest rotation of the carriage 10 when the first latch lever 48 is in a position to engage the deck 40. FIG. 1 shows the carriage 10 held in a position where the cartridge 13 is brought to a playing position by the second latch lever 53**.

Provided on the deck 40 are a capstan 55 for playing the cartridge to be brought to the playing position, a magnetic head 56, and an endmark detector 57 for controlling operation of magnetic head shift means (not shown since this forms no part of the present invention) for changing over the record tracks of the magnetic tape within the cartridge to be played by shifting the magnetic head 56. The capstan 42 upwardly extends through a hole (not shown) in the deck 40 and is connected at its lower end to driving mechanism (not shown) with a motor (not shown) provided under the deck. The capstan is rotatably driven in the direction of the arrow as shown by the motor. In addition to the capstan 56 and the magnetic head 57, there is provided on the deck 40 guides 58, 59 for securing relative position of the cartridge in the playing position with respect to the deck.

A driving means for cooperating with the tension springs 44 to slidably move the deck 40 includes a rubber covered cam wheel 60. A lever 61 is supported at its one end by an axis 62 attached to a fixed portion (not shown) spacedly positioned upwardly of the deck 40. The cam wheel 60 is rotatably provided to an axis 63 fixed to the lever 61 at its free end. The lever 61 is pivotally biased about the axis 62 in the direction of the arrow as shown by a relatively strong spring (not shown), and movement of the lever 61 is normally limited by a stopper pin 64 mounted to the fixed portion provided with the axis 62. The deck 40 is caused to be rightwardly and slidably moved under the bias of the tension spring to allow the capstan 55 to abut against the cam wheel 60 in response to movement of the first latch lever 48 to a position disengaging from the hook lever 45 due to movement of the plunger 51 of the solenoid 50 when the solenoid is energized by a control circuit as will be described later. The rotational force of the capstan 55 rotatably drives the cam wheel 60 in the direction of arrow B. The deck 40 is initially moved in the rightward direction and then moved in the leftward direction against the bias of the tension spring 44 since the cam wheel 60 is designed to allow the deck to move in such a manner as mentioned through a first half rotation and second half rotation of the wheel. The cam wheel 60 is provided with a step portion 65 at its maximum eccentric portion. This step portion is caused to be opposite to the capstan 55 to disengage therefrom when the deck 40 is held by engagement of the hook lever 45 with the latch lever 48, as shown in FIG. 1.

When the first latch lever 48 is pivoted by the solenoid 50 to a position to disengage from the hook lever 45, the second latch lever 53 is moved through the link 54 to a position to disengage from the slot 36 of the carriage 10 whereby permitting of rotation of the carriage 10.

Figure 3:
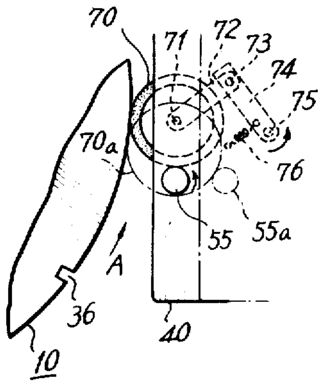
FIG. 3 is a representation showing a mechanism for rotating the carriage shown in FIG. 1.

There is shown in FIG. 3 one form of driving mechanism for rotatably driving the carriage 10. Similar numerals are used to illustrate like parts in FIG. 1.

The driving mechanism includes a frictional roller 70 which abuts against the capstan 55 downwardly of the deck 40 and is rotatably driven by the capstan. A lever 74 is swingably supported at its one end by an axis 75 provided to the sub-plate (not shown). The frictional roller 70 is rotatably supported by an axis 71 mounted to the other end of a lever 72 connected through a connecting pin 73 to the free end of the lever 74. The lever 74 is biased in the direction of the arrow as shown by a spring 76. When the frictional roller 70 is in a position where the deck 40 is shown by the solid line (the deck being held by engagement of the hook lever 45 with the latch lever 48), the frictional roller is caused to abut against the carriage 10 and the capstan 55 at their periphery. In this case, however, the abutment force of the capstan 55 is so weak that roller 70 slips on the capstan 55. Therefore, the rotational force of the capstan is not imparted through the frictional roller 70 to the carriage 10. Even though the frictional roller 70 is rotatably driven by the capstan, the roller 70 still slips on the carriage 10 since the carriage 10 is held by the second latch lever 53. When the deck 40 is in a position shown by a dash-dotted line (a non-reproducing station where the deck is extremely away from a reproducing station to play the cartridge in the playing position upon disengaging the hook lever 45 from the latch lever 48), the capstan 55 is moved to a position **55*a* shown by a dash-dotted line while the frictional roller 70 is also moved to a position 70*a* shown by a dash-dotted line. Accordingly, the frictional roller 70 is intended to be held by the carriage and the capstan and urgedly abuts against the capstan and then is rotated. On the other hand, when the deck 40 is in the non-reproducing station, the carriage 10 is rotatably driven in the direction of the arrow A with rotation of the frictional roller 70 since the carriage 10 disengages from the second latch lever 53. If the periphery of the cam wheel 60 is a circular arc along the dotted line 66 with respect to the axis 63 as shown in FIG. 1, the deck 40 is maintained stationary for the period when the cam wheel 60 is rotated through an angle corresponding to the dotted line 66. After the carriage 10 has been rotated, the solenoid 51 is not supplied with current to allow the second latch lever 53 to be returned to a position where the end of the lever 53 engages the carriage 10 at the periphery thereof. In this status, the carriage 10 is permitted of its rotation. When the carriage 10 is rotated through 60° by the carriage driving means, the second latch lever 53 engages the next slot 36 on the carriage to arrest rotation of the carriage 10. For instance, the cartridge 13 is initially positioned in the playing position as shown in FIG. 1, and the next cartridge 14 is brough to the playing position by rotation of the carriage 10 through 60°. Incidentally, it will be readily understood that the carriage 10 is regulated by the reduced portions 33 and the rollers 35 and is slidably moved down along with the shaft in the course of rotation of the carriage 10. A movable speed of the deck 40 and a rotational speed of the carriage 10 are selected so that the deck 40 is away from the reproducing position as long as the carriage 10 is rotated through 60°. These speeds entirely depend upon dimensions of the cam wheel 60 and the frictional roller 70**.

After the cartridge 17 has been held in the playing position, the deck 40 is returned to the reproducing station, and the forward portion of the cartridge 14 is held by the guides 58, 59 to securely regulate a relative position of the cartridge to the deck 40. When the deck 40 is in the first position, the capstan 55 abuts against the pinch roller 37 within the cartridge in the play position and the magnetic head 56 is close to an endless magnetic tape (not shown in the cartridges 14 to 18 in FIG. 1 for the purpose of simplicity) to transduce the same. Consequently, the cartridge 14 in the play position is transported and played by association of the pinch roller with the capstan. Abutment force between the capstan 55 and the pinch roller 37 is obtained in a manner that the retention roller 29 is pressed against the inclined wall of the notch 31 in the cartridge under the bias of the displaceable member 27.

Figure 4:
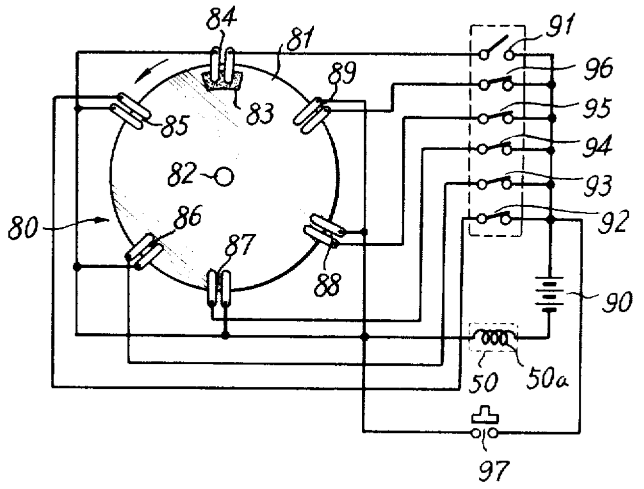
FIG. 4 is a representation showing a control circuit for controlling current supply to the solenoid shown in FIG. 1.

FIG. 4 showns a control circuit for controlling current supply to the solenoid 50. An excitation coil for the solenoid 50 is indicated by numeral **50*a*. The control circuit includes a rotary switching means 80. The rotary switching means 80 includes an insulation rotary disk 81 tightly mounted to a shaft 82 which is adapted to rotate in synchronism with the carriage 10. A conductive piece 83 is provided to the rotary disk 81 at the upper surface thereof. Switches 84 to 89 each consisting of a pair of contacts are mounted on a fixed member (not shown) of insulation, which is provided corresponding to the rotary disk 81. The switches 84 to 89 are spaced 60° apart from another and successively closed by the conductive piece 83 due to rotation of the rotary disk 81 as the shaft 82 is rotated. The contacts on one hand with respect to the switches 84 to 89 are connected through the excite coil 50*a* of the solenoid 50 with the minus terminal of a power source 90 and the other contacts are respectively connected through cartridge selecting switches 91 to 96 provided corresponding to the cartridges 13 to 18 (FIG. 1) with the plus terminal of the source 90. The cartridge selecting switches 91 to 96 are provided for designating the cartridge to be played within the carriage 10** and they are so adapted that one which is manually operated is opened and the remainders are maintained in closed condition.

FIG. 4 shows the cartridge 13 held in the play position and played when the selecting switch 91 is operated and opened while the conductive piece 83 n the rotary disk 81 closes the switch 84. How, in order to play the cartridge 16 in place of the cartridge 13, this is accomplished by operation of the selecting switch 94 corresponding to the cartridge 16. This opens the selecting switch 94 and at the same time the selecting switch 91 which has been opened is now closed. As a result, the current from the source 90 is applied through the selecting switch 91, the switch 84 which has been closed by the conductive piece 83 to the coil **50*a* of the solenoid 50 whereby the solenoid is energized. Thus, the deck 40 and the carriage 10 are free from their engagement so that the deck 40 is permitted of reciprocal movement and the carriage 10 is freed for rotational movement. When the carriage 10 is rotated through 60° to bring the cartridge 14 to the play position, the rotary disk 81 is rotated through 60° in the direction of the arrow as shown to allow the conductive piece 83 to close the switch 85. During the time that the conductive piece 83 is away from the switch 84 to close the switch 85, the solenoid 50 is not supplied with the current from the power source 93. On the other hand, if the switch 85 is closed by the conductive piece 83, the solenoid 50 is energized through the selecting switch 92, the switch 85 by the source 90. Therefore, the carriage 10 is not held in a position where the cartridge 14 is positioned in the play position since the second latch lever 53 does not engage the slot 36 of the carriage 10. This allows of further rotation of the carriage 10. There the carriage 10 is further rotated through 60° to bring the cartridge 15 to the play position, the solenoid 50 is energized by the source 90 through the selecting switch 94 and the switch 86 which is closed by the conductive piece 83. This also allows of further rotation of the carriage 10. If the carriage 10 is rotated to a position where the cartridge 16 is brought to the play position, the switch 87 is closed by the conductive piece 83, however, the solenoid 50 is not energized since the selecting switch 94 has been opened as mentioned hereinbefore. For this reason, the second latch lever 53 engages the slot 36 while the carriage 10 is held at a position where the cartridge 16 is held in the play position. In this manner, the cartridge 16 designated for its play is brought to the play position and the deck 40 is returned to the reproducing station and played by disengaging the hook lever 45 from the first latch lever 48**.

As stated in the foregoing, it is assumed that the cartridge 16 is played in accordance with operation of the selecting switch 94. However, it will be understood that even if the other selecting switch is operated, the pertinent cartridge corresponding to the operated selecting switch is brought to the play position.

A push button switch 97 connected in parallel to the source 90 and the coil 50*a* of the solenoid 50 is used for the case as described hereinafter. If the selecting switches 91 to 96 are such that they are independently closed and operated, all the selecting switches are maintained open. Now, the switch 97 is instantly pressed and closed, the solenoid 50 is energized in pulse fashion by the source 90. As a result, the carriage 10 is disengaged from the second latch lever 53 and is thus rotated through 60° whenever the push button switch 97 is operated. This means that the cartridges 13 to 18 are successively brought to the play position whenever the push button switch 97 is operated.

While the invention has been fully described with respect to the embodiments by reference to the accompanying drawings, the invention is not limited to the embodiments and various modification and changes may be made within the scope of the appended claims.

What is claimed is:

1. A tape playing apparatus for use with a plurality of endless magnetic tape cartridges, comprising:

a horizontal rotatable carriage slidably movable up and down along its axis of rotation and being provided with holding means for holding a plurality of endless tape cartridges on two different horizontal levels with the cartridges in each level being radially disposed with respect to said carriage and the forward end of each cartridge facing outwardly, said holding means including lower stage holding means and upper stage holding means each having a plurality of holding elements corresponding in number to the number of the cartridges in each level for releasably holding the respective cartridges, said holding elements being equally and radially spaced on their respective levels and the holding elements on one of the levels being angularly offset from the holding elements on the other level; carriage driving means for rotatably driving said carriage;

carriage latch means for latching said carriage in a position where a predetermined one of the cartridges is brought to a predetermined play position said carriage drive means being operable to stop the rotation of said carriage when said carriage is latched by said carriage latch means;

shift means for alternately moving the carriage up and allowing the carriage to move down a distance corresponding to the difference between the upper stage and the lower stage of the holding means as the carriage is angularly rotated corresponding to the distance between adjacent holding elements, each of the cartridges in the lower and upper stages being brought to the same level in the play position by said shift means; a movable deck having a capstan adapted to be in abutment with a pinch roller of the cartridge in the play position and including a magnetic head for engaging the endless tape of said cartridge; deck driving means for reciprocally moving the deck between a reproducing station in which a tape in the play position may be transduced and a second station remote from said reproducing station; deck latch means for latching the deck in said reproducing station where the capstan abuts against the pinch roller of the cartridge in the play position; and control means for actuating the carriage latch means and the deck latch means when said predetermined cartridge is in the play position.

2. A tape playing apparatus as claimed in claim 1, wherein said holding elements each include a pair of parallel guide members sufficiently spaced apart to receive a cartridge inserted between the guide members.

3. A tape playing apparatus as claimed in claim 2, wherein one of the guide members of said pair is provided with a leaf spring fixed at one end to the guide member and being displaceable at the other end, and a retention member on the displaceable end of the leaf spring and positioned between said pair of guide members, the cartridge being held between the guide members when the retention member is inserted into a notch on the side wall of the cartridge under the bias of the leaf spring.

4. A tape playing apparatus as claimed in claim 3, wherein each pair of guide members of the holding elements in said upper stage is angularly laid over an associated pair of guide members of the holding elements in said lower stage.

5. A tape playing apparatus as claimed in Claim 1, wherein said shift means includes a cam surface having a plurality of reduced portions and flanges alternately and circumferentially arranged with respect to said carriage at under side thereof, and a plurality of guide rollers, the carriage rides through the cam surface, the carriage being moved down when the reduced portions of the cam surface are positioned over the guide rollers while the carriage being moved up when the flanges of the cam surface are disposed over the guide rollers.

6. A tape playing apparatus as claimed in claim 5, wherein the difference in level between the reduced portions and flanges of the cam surface of said carriage is equal to difference in level between the lower stage and the upper stage of said holding means.

7. A tape playing apparatus as claimed in claim 1, wherein said carriage latch means includes slots equally spaced at the periphery of said carriage and corresponding in number to that of said holding elements on both levels, and a pivotally movable latch lever operable to engage one of the slots when the carriage is rotated to allow one of the cartridges to be brought to said play position.

8. A tape playing apparatus as claimed in claim 7, wherein said control means includes a solenoid for moving said latch lever of said carriage latch means out of engagement with said slot when it is energized, and a control circuit for controlling current supply to the solenoid.

9. A tape playing apparatus as claimed in claim 8, wherein said deck latch means is actuated by said solenoid to disengage from engagement with said deck.

10. A tape playing apparatus as claimed in claim 8, wherein said control circuit includes rotary switch means for rotation in synchronism with said carriage, a plurality or cartridge selecting switches corresponding to individual cartridges on the carriage for designating the cartridges to be played, a power source for supplying energy to said solenoid, each selecting switch being in series connection with said solenoid and power source through said rotary switch means, the control circuit being operable to deactuate the solenoid when an opened selecting switch is brought into series connection with said solenoid and power source by said rotary switch means, and wherein said carriage latch means is operable to latch said carriage in a position wherein the cartridge designated by the open cartridge selecting switch is brought to said play position.

* * * * *